Patented Apr. 30, 1946

2,399,243

UNITED STATES PATENT OFFICE 2,399,243

COMPOSITION OF MATTER SUITABLE FOR USE AS A LUBRICANT AND LUBRICANT COMPRISING THE SAME

John M. Musselman, South Euclid, Ohio, assignor to The Standard Oil Company, Cleveland, Ohio, a corporation of Ohio No Drawing. Application June 27, 1944, Serial No. 542,436

9 Claims. (Cl. 252—32.7)

This invention relates to lubricants and additives therefor, and more particularly to lubricants suited for various uses, including high pressures or high temperatures or both as, for example, use in internal combustion engines operating at higher temperatures and in which the lubricant is in close contact with metal surfaces. Such lubricants, when used under these conditions particularly, are subject to breakdowns due to sludge and acid formation.

An object of the invention is to provide a new composition suitable for use as a lubricant, or as an agent for addition to lubricating oils and greases, whereby sludge and acid formation and other forms of deterioration are inhibited under operating conditions.

Another object of the invention is to provide a composition having the above properties made from materials not heretofore utilized in compositions of this general nature.

Various other objects and advantages will be apparent as the nature of the invention is more fully disclosed.

In my Patent No. 2,331,923 granted on October 19, 1943, I have disclosed the reaction product of a naturally occurring wax with a phosphorus sulfide, and also metal compounds thereof, as suitable for lubricating uses and as additives to lubricating oil.

The waxes utilized in accordance with said patented invention are higher fatty acid esters of higher mono-atomic alcohols. For example, beeswax consists primarily of myricyl palmitate $C_{30}H_{61}$—$C_{16}H_{31}O_2$. Spermaceti is formed primarily of cetyl palmitate $C_{16}H_{33}$—$C_{16}H_{31}O_2$. Degras and lanolin comprise higher fatty acid esters of cholesterol ($C_{27}H_{45}OH$). It will be seen that all of these naturally occurring waxes have not only a higher molecular weight fatty acid radical as a component, but also a higher molecular weight alcohol radical as a component.

In accordance with the present invention, I have found that certain fatty acid esters of mono-atomic alcohols, which esters have a much lower molecular weight than naturally occurring waxes, may be treated with a sulfide of phosphorus in such proportions and under such temperature conditions as to produce a novel reaction product containing an appreciable amount of sulfur and a minimum amount of oxygen and phosphorus. The reaction product is separated from an oxygen and phosphorus containing by-product residue or sludge, which may be in the form of oxides of phosphorus or as phosphates. The reaction indicated by the available facts appears to be one in which the sulfur of the phosphorus sulfide replaces at least a portion of the oxygen in the ester, and preferably substantially all or at least a major portion. The displaced oxygen at least in part combines with the phosphorus of the sulfide to form a phosphorus oxygen-containing residue or sludge, probably in the form of phosphorus pentoxide, which can be separated from the wanted novel reaction product.

If desired the reaction product may then be reacted with a basic compound, either organic, such as an amine, or metallic, such as an oxide or hydroxide, to form the corresponding salt thereof.

It is important that the reaction between the ester and the phosphorus sulfide be carried out at a temperature above the temperature at which thiophosphates would be formed, so that a minimum of a phosphorus enters into the reaction product in chemical combination and so that the reaction product is substantially free or has a minimum of thiophosphates. Also, a minimum of oxygen remains in the reaction product since the phosphorus eliminates at least part and preferably a major portion of the oxygen, probably in the form of a phosphorus oxide or other phosphorus and oxygen-containing residue. The temperature may vary somewhat, depending upon the molecular weight of the ester and the rate of reaction desired. The temperature limits in any case may be determined readily by an analysis of the reaction product to determine if it is a thiophosphate; if it is, the temperature that has been employed for the particular ester involved is too low to make the reaction product of the invention. In view of the many variables involved, it is difficult to assign a temperature in numerical terms that is optimum for all esters, but in general, temperatures should be above 270° F., and preferably around 290 to 310° F. Temperatures in excess of 350 to 400° F. are not required in order that the reaction may proceed rapidly, and there is no point in using a higher temperature than is necessary.

It is preferred that the amount of the phosphorus sulfide be at least equivalent to the theoretical amount required for the sulfur in the sulfide to replace the oxygen of the ester. The amount of the sulfide will vary with the molecular weight and purity of the ester, but no difficulty is involved in making the simple chemical calculations. A small excess over the theoretical amount of the sulfide, for example not over 10%, may be of assistance in forcing the reaction to completion. The excess preferably should not be too great, since at least a part of any excess may remain dissolved in the reaction product and increase the sulfur and phosphorus content thereof in the molal ratio present in the phosphorus sulfide.

The phosphorus sulfide to be used preferably is phosphorus pentasulfide, since this is readily available. Any other phosphorus sulfide may be used however, for example, phosphorus sesquisulfide.

When practicing the invention on a commercial scale, it is practical to form the reaction product with less than 2% oxygen and with less than 1.6% of phosphorus. Any phosphorus which remains in the reaction product may be entrained rather than in a chemical combination, or at any event, any phosphorus is not essential to the properties of the final product as shown by the fact that the reaction product may be washed and phosphorus removed by washing without interfereing with the desirable properties of the reaction product. This indicates that the novel properties of the reaction product is not dependent upon any thiophosphate content therein.

The process is applicable to fatty acid esters of mono-atomic alcohols having a total of not over 22 carbon atoms. The esters also should have a boiling point at least as high as the reaction temperature, i. e., at least about 270° F., in order that the ester may not volatilize during the manufacturing process. The esters may have a relatively low molecular weight alcohol radical and a higher molecular weight fatty acid radical, such as methyl, ethyl, propyl and butyl, palmitate or stearate. On the other hand, the alcohol radical may have a higher molecular weight than the acid radical, such as cetyl or stearyl propionate or butyrate. Alternatively, the ester may have both alcohol and the acid radicals of intermediate molecular weight, such as octyl laurate. Mixtures of any of the above esters may be used. These esters may be used in admixture with other esters, but such mixtures should include at least a major portion of esters within the above definition. Reference to the esters herein include all such mixtures.

In the above examples, both the alcohol and the acid radical are saturated. This is preferable, since if the ester is unsaturated, the yield is lowered. This may be due to polymerization, which, it is thought, may be accelerated by the catalytic action of the phosphorus oxide by-product residue. The ester may have a limited degree of unsaturation without too great a loss and, in general, the iodine value of the ester or a mixture thereof should not be in excess of about 35.

The above esters, for the most part, do not occur in large quantities in nature, and are not a common component of oils, fats and waxes. They are made synthetically by esterification processes. Inasmuch as their molecular weight is lower than waxes, the percentage of sulfur that may be introduced into them is much higher. Also since there is reason to believe that the efficacy of the reaction product in a lubricant is dependent to a large extent on the amount of sulfur, the reaction products of these lower molecular weight esters give rise to superior results.

After the reaction between the ester and the phosphorus sulfide is completed the phosphorus and oxygen-containing by-product residue separates out or may be separated, together with any other insoluble materials. It may be removed from the reaction product by settling and decanting, centrifuging or filtering.

If it desired, the ester may be mixed with a mineral lubricating oil, preferably not more than about 200%, in order to facilitate the reaction and improve the yield, such as by lowering the concentration of a catalytic by-product, thus decreasing the tendency toward polymerization. The addition of the oil before or after the reaction also facilitates the separation of the residue.

Also, if desired, the amount of phosphorus sulfide may be divided into two or more portions and one portion added, following which the reaction mixture may be neutralized before the remainder of the phosphorus sulfide is added. This procedure in effect neutralizes the acidity in the residue and improves the yield of the product.

The following examples are included as illustrative but without limitation on the invention of the scope otherwise herein defined:

*Example I*

Methyl stearate is reacted with 25 to 35%, preferably about 30% of phosphorus pentasulfide at a temperature of between 280 and 325° F., preferably around 300° F. Since the reaction is exothermic, the phosphorus pentasulfide preferably is added at a rate such that the temperature does not rise excessively. After the reaction is complete, which may be over a period of 2 to 4 hours, the material may be centrifuged or permitted to stand. If a lubricating oil has been admixed with the methyl stearate initially, or if it is added at this stage, the settling of the by-product residue is facilitated. After the by-product residue is separated, the reaction product may be decanted. Following this it is filtered, preferably with the use of a filter aid, and is suitable for use as such as a lubricant, or it may be added to a lubricating oil in an amount such that the reaction product is present to an amount of 0.1 to 15%, preferably about 2 to 6%.

The procedure may be repeated using a mixture of methyl palmitate, stearate, and oleate in such proportions that the I. V. of the mixture is not over 35.

*Example II*

As another example 100 pounds of butyl caprylate is placed in a reaction vessel and a portion of a total of about 40 pounds of phosphorus pentasulfide is added thereto at increments, while the temperature is maintained within the range of 280 to 310° F. The phosphorus pentasulfide is added so that this temperature range is not exceeded. If desired, the material may be cooled by the use of suitable cooling coils in the reaction vessel, whereupon the phosphorus pentasulfide can be added at a faster rate. After all of the phosphorus sulfide has been added the reaction is permitted to continue at the above temperature for a period of 1 to 2 hours to insure its completion, following which the reaction mixture may be separated, completed and used in accordance with the previous example. The sulfur content of the reaction product can approach the theoretical of about 28% as compared with about 10% for degras (assuming it to be cholesteryl palmitate).

*Example III*

Cetyl acetate in an amount of 1000 pounds is placed in a reaction vessel containing a stirrer provided with appropriate heating and cooling coils and heated to a temperature of about 250° F. To the cetyl acetate in the reaction kettle is added 310 pounds of phosphorus pentasulfide, which should be introduced in separate portions at a rate such that the temperature does not exceed 350° and preferably 310° F. When half of the phosphorus pentasulfide (155 pounds) has been added, an amount of lime may be introduced to neutralize the reaction mixture. This is thought to convert the phosphorus oxide in the by-product to a calcium phosphate. Following this, the remainder of the phosphorus pentasulfide is added in the same manner, and the reaction is continued for a length of time to insure completion. The reaction product may be separated from the by-product which in this case will include a crystalline material, probably in the form of a calcium phosphate.

Any of the above reaction products may be converted into the salt or soap thereof by treatment with any basic compound. This compound may be of an organic nature, such as an amine, an alkylolamine, pyridine, or other compounds recognized in the general class of organic bases. A basic metal compound may be used, such as an oxide or hydroxide. These metals may be an alkali metal, such as sodium, potassium and lithium, or an alkaline earth metal, such as calcium, barium, magnesium or strontium. The metal also may be aluminum or lower than aluminum in the electromotive series, such as chromium, cadmium, cobalt, antimony, bismuth, arsenic, mercury, etc. The metal should be selected with reference to the use of the composition and the properties desired in it. For example, metals which are known to have pro-oxygenic effect under certain conditions may be used in making additives for gear box greases but preferably not in making additives where oxidation conditions are severe. The alkali metals have excellent emulsifying characteristics. The alkaline earth metals have excellent detergent characteristics with a minimum of emulsification. The heavier metals have surface inhibition characteristics. The amount of the basic compound to be employed will depend largely on the molecular weight of the basic compound and the saponification value of the reaction product. The pH value of the reaction product will be within the range of 2 to 6, whereas the fully neutralized or saponified product is above 7, depending on the alkalinity of the base used. The amount of the base employed should be such that the acidity is materially reduced in the reaction product. The amount of the basic compound will vary from about 1 to 15%, depending upon the factors mentioned.

The amount of the metal compound also will depend on whether the reaction product is to be completely or partially saponified or neutralized. If desired, the amount of the basic compound may be such as only to saponify partially the reaction product so as to form a mixture of the unsaponified reaction product and the metal compound thereof. Such a mixture is advantageous under some circumstances, since it embodies the peptizing, detergent, or inhibiting features of the saponified product together with the maintenance of the clean surfaces which may be attributed, at least in part, to the presence of polar groups in the unsaponified portion.

The reaction product may also be treated with the plurality of metals, for example, sodium and calcium, calcium and barium, sodium and arsenic and calcium and bismuth are desirable combinations. A mixture of two or more metals also may be used when the reaction product is only to be partly saponified. I am not certain if both of the metals become chemically combined in a single molecule or if the new composition or additive comprises a mixture in which the two metals are each in different molecules. However, I intend either possibility to be covered and included within my description of the plural metal compound of the reaction product.

In the case of certain higher metals, the oxides or hydroxides of which are not very reactive, the reaction product may be converted into an alkali metal saponification product and this may then be reacted with the salt of a higher metal to replace the alkali metal to form the desired heavier metal compound. If desired only a part of the alkali metal may be replaced by the heavier metal and in this way the mixture of alkali metal and heavier metal may be formed.

In making any of the basic or saponified compounds, the reaction product, preferably after it is separated from the residue, is heated to a temperature of about 180° F. and the basic compound added. The reaction proceeds better if water is present so that the temperature preferably is kept below 212° F. unless pressure is used. If the saponification is carried out at a higher temperature under pressure, for example, in a closed vessel in the presence of water and at a temperature to produce a pressure of about 50 pounds per square inch, the reaction time may be reduced from about eight hours to about one hour.

The reaction is continued until the acidity is reduced to the desired point or until the ash content is raised to the desired level. After the reaction, which may proceed from 1 to 8 hours, the product is heated to about 250° F. to drive off any water and the mixture is settled and the metal compound reaction product is separated from any unreacted basic or metal compound and filtered. If the initial reaction product is to be converted into a saponified reaction product it is not necessary to filter the initial reaction product before reacting it with the basic compound, but it is preferred to separate the reaction product from any sludge such as by settling and decanting.

The amount of the above described basic or metal compound of the reaction product to be added to an oil or grease, if it is not used as a lubricant in its undiluted form would depend upon the characteristics of the oil or grease and the intended use. Some oils have more of a tendency to form acid and sludge than others, and such oils require larger quantities of the addition agent. Also oils that are intended for higher temperatures require larger amounts of the additive. In general, the range is from 1 to 15%, but under some circumstances amounts as low as 0.01% show a remarkable improvement. Since the addition agent is a lubricant itself, there is no upper limit to the amount that may be added to an oil. It is uneconomic, however, to add more than is necessary to impart to the oil the desired properties.

An S. A. E. 20 Mid-Continent lubricating oil containing 5% of any of the reaction products above mentioned or the salts thereof, for example, the partially saponified calcium and barium dual metal salts of the $P_2S_5$-ethyl laurate reaction product, when subjected to a standard twenty hour test in an Ethyl Gasoline Corporation type test engine, shows a remarkable improvement with reference to sludge formation, acid number, viscosity increase, and deposit on the piston skirt, as compared with the same oil without the addition agent when treated under similar conditions.

In addition to rendering the lubricating oil more resistant to oxidation and improving its detergent qualities, these additives as described possess remarkable extreme pressure qualities. Thus the addition to a lubricating oil of from 1% to 6% of the $P_2S_5$ reaction product of methyl stearate greatly improves the oil as tested, both by the Cornell test and Timken test as run under prescribed conditions. The straight reaction products appear to have somewhat superior E. P. properties over the metal soaps but this is not meant to imply that the metal soaps lack this property, because the metal soaps also possess this property and the degree to which this property is retained appears to be a function of the type of metal used and degree of saponification. The use of these reaction products and soaps made therefrom are more satisfactory in general than those normally used, and containing active chlorine, in that corrosion at higher temperatures is greatly reduced and the body of the oil remains more stable due to the inhibiting nature of the additive.

In certain cases, depending on the type of ester and type of metal used and degree of saponification attained, these reaction products have a great effect on the cold test of the mineral oil to which they are added. Thus the barium soap of the reaction product of methyl palmitate and $P_2S_5$ has a pronounced effect on the cold test of an S. A. E. 20 motor oil, lowering it perceptibly.

It will be obvious to one skilled in the art that a wide variety of materials fall within the group defined generically herein and illustrated by a number of examples and that various processing procedures may be adopted in making the new composition which will result in a variety of compositions within the generic type described herein as constituting the invention. All of the same as fall within the scope of the following claims are intended to be included within the invention.

I claim:

1. A composition of matter suitable for use as a lubricant and as an addition agent to improve the characteristics of lubricating oils and greases, comprising the reaction product of a phosphorus sulfide with a fatty acid ester of a mono-atomic alcohol, said ester having a boiling point above that of the reaction temperature and having not over 22 carbon atoms, reacted at a temperature at which oxygen in the ester is replaced by the sulfur of the sulfide and said replaced oxygen combined with the phosphorus of the sulfide, the amount of the sulfide being at least sufficient to substantially complete the reaction that occurs at said temperature.

2. A composition of matter suitable for use as a lubricant and as an addition agent to improve the characteristics of lubricating oils and greases, comprising the reaction product of phosphorus pentasulfide with a fatty acid ester of mono-atomic alcohol, said ester having a boiling point above that of the reaction temperature and having not over 22 carbon atoms, reacted at a temperature at which oxygen in the ester is replaced by the sulfur of the sulfide and said replaced oxygen combined with the phosphorus of the sulfide, the amount of the sulfide being at least sufficient to substantially complete the reaction that occurs at said temperature.

3. A composition of matter suitable for use as a lubricant and as an addition agent to improve the characteristics of lubricating oils and greases, comprising the hereinafter named reaction product, at least a part of the acidity of which is neutralized with a basic compound, said reaction product being of a phosphorus sulfide with a fatty acid ester of a mono-atomic alcohol having a boiling point above that of the reaction temperature, and having not over 22 carbon atoms, reacted at a temperature at which oxygen in the ester is replaced by the sulfur of the sulfide and said replaced oxygen combined with the phosphorus of the sulfide, the amount of the sulfide being at least sufficient to substantially complete the reaction that occurs at said temperature.

4. A composition of matter suitable for use as a lubricant and as an addition agent to improve the characteristics of lubricating oils and greases, comprising a metal compound of the reaction product of phosphorus pentasulfide with a fatty acid ester of a mono-atomic alcohol having a boiling point of above that of the reaction temperature and having not over 22 carbon atoms, reacted at a temperature at which oxygen in the ester is replaced by the sulfur of the sulfide and said replaced oxygen combined with the phosphorus of the sulfide, the amount of the sulfide being at least sufficient to substantially complete the reaction that occurs at said temperature.

5. A method of making a composition of matter suitable for use as a lubricant and as an addition agent to improve the characteristics of lubricating oils and greases, which comprises adding a phosphorus sulfide to a fatty acid ester of a mono-atomic alcohol having a boiling point above that of the reaction temperature and having not over 22 carbon atoms, the amount of the sulfide added being at least sufficient to substantially complete the reaction that occurs at said temperature, completing the reaction between said sulfide and said ester at a temperature at which oxygen in the ester is replaced by the sulfur of said sulfide and said replaced oxygen combined with the phosphorus of said sulfide, and separating the reaction product from a phosphorus and oxygen containing residue.

6. A method of making a composition of matter suitable for use as a lubricant and as an addition agent to improve the characteristics of lubricating oils and greases, which comprises adding phosphorus pentasulfide to a fatty acid ester of a mono-atomic alcohol having a boiling point above that of the reaction temperature and having not over 22 carbon atoms, said addition of the phosphorus sulfide being at a rate such that a temperature of 400° F. is not exceeded, the total amount of the sulfide added being at least sufficient to substantially complete the reaction that occurs at said temperature, completing the reaction between said sulfide and said ester at a temperature at which oxygen in the ester is replaced by the sulfur of said sulfide and said replaced oxygen combined with the phosphorus of said sulfide, and separating the reaction product from a phosphorus and oxygen containing residue.

7. A method of making a composition of matter suitable for use as a lubricant and as an addition agent to improve the characteristics of lubricating oils and greases, which comprises adding a phosphorus pentasulfide to a fatty acid ester of a mono-atomic alcohol having a boiling point above that of the reaction temperature and having not over 22 carbon atoms, the amount of the sulfide added being at least sufficient to substantially complete the reaction that occurs at said temperature, completing the reaction between said sulfide and said ester at a temperature at which oxygen in the ester is replaced by the sulfur of said sulfide and said replaced oxygen combined with the phosphorus of said sulfide, and reacting the reaction product with a basic compound to neutralize at least part of the acidity of the reaction product.

8. A method of making a composition of matter suitable for use as a lubricant and as an addition agent to improve the characteristics of lubricating oils and greases, which comprises adding phosphorus pentasulfide to a fatty acid ester of a mono-atomic alcohol having a boiling point above that of the reaction temperature and having not over 22 carbon atoms, said addition of the phosphorus sulfide being at a rate such that a temperature of 400° F. is not exceeded, the total amount of the sulfide added being at least sufficient to substantially complete the reaction that occurs at said temperature, completing the reaction between said sulfide and said ester at a temperature at which oxygen in the ester is replaced by the sulfur of said sulfide and said replaced oxygen combined with the phosphorus of said sulfide, and reacting the reaction product with a basic metal compound to neutralize at least part of the acidity of the reaction product and form the corresponding metal compound of said reaction product.

9. A method of making a composition of matter suitable for use as a lubricant and as an addition agent to improve the characteristics of lubricating oils and greases, which comprises adding phosphorus pentasulfide to a fatty acid ester of a mono-atomic alcohol having a boiling point above that of the reaction temperature and having not over 22 carbon atoms, said addition of the phosphorus sulfide being at a rate such that a temperature of 400° F. is not exceeded, the total amount of the sulfide added being at least sufficient to substantially complete the reaction that occurs at said temperature, completing the reaction between said sulfide and said ester at a temperature at which oxygen in the ester is replaced by the sulfur of said sulfide and said replaced oxygen combined with the phosphorus of said sulfide, separating the reaction product from a phosphorus and oxygen containing residue, reacting the reaction product with a metal hydroxide to neutralize at least part of the acidity of the reaction product, and filtering the final reaction mixture.

JOHN M. MUSSELMAN.